(12) United States Patent
Huang et al.

(10) Patent No.: US 12,351,528 B2
(45) Date of Patent: Jul. 8, 2025

(54) CRACK SELF-HEALING AGENT FOR CEMENT-BASED MATERIALS CAPABLE OF BINDING CORROSIVE IONS IN SEAWATER, AND PREPARATION METHOD THEREOF

(71) Applicant: South China University of Technology, Guangdong (CN)

(72) Inventors: Haoliang Huang, Guangdong (CN); Xintong Wu, Guangdong (CN); Hao Liu, Guangdong (CN); Jie Hu, Guangdong (CN); Jiangxiong Wei, Guangdong (CN); Qijun Yu, Guangdong (CN)

(73) Assignee: South China University of Technology, Guangzhou (CN)

( * ) Notice: Subject to any disclaimer, the term of this patent is extended or adjusted under 35 U.S.C. 154(b) by 722 days.

(21) Appl. No.: 17/575,633

(22) Filed: Jan. 13, 2022

(65) Prior Publication Data

US 2022/0135490 A1     May 5, 2022

Related U.S. Application Data

(63) Continuation-in-part of application No. PCT/CN2020/099003, filed on Jun. 29, 2020.

(30) Foreign Application Priority Data

Jul. 18, 2019   (CN) .......................... 201910652139.7

(51) Int. Cl.
| C04B 40/06 | (2006.01) |
| B28B 3/02 | (2006.01) |
| C04B 18/02 | (2006.01) |
| C04B 22/00 | (2006.01) |
| C04B 22/06 | (2006.01) |
| C04B 41/00 | (2006.01) |
| C04B 41/46 | (2006.01) |
| C04B 41/48 | (2006.01) |
| C04B 111/34 | (2006.01) |

(52) U.S. Cl.
CPC ............ *C04B 40/0675* (2013.01); *B28B 3/02* (2013.01); *C04B 18/021* (2013.01); *C04B 22/0093* (2013.01); *C04B 22/064* (2013.01); *C04B 41/009* (2013.01); *C04B 41/463* (2013.01); *C04B 41/4869* (2013.01); *C04B 2111/343* (2013.01)

(58) Field of Classification Search
CPC .............. C04B 40/0675; C04B 18/021; C04B 22/0093; C04B 22/064; C04B 41/009; C04B 41/463; C04B 41/4869; C04B 2111/343; C04B 2111/00612; C04B 2111/72; C04B 2111/726; C04B 26/06; B28B 3/02; B28B 19/0092; E02B 3/16; E04G 23/0203

See application file for complete search history.

(56) References Cited

FOREIGN PATENT DOCUMENTS

| CN | 105969143 A | | 9/2016 | |
| CN | 108409175 A | | 8/2018 | |
| CN | 109574527 A | | 4/2019 | |
| JP | 2011256065 A | * | 12/2011 | |
| JP | 2018203582 A | * | 12/2018 | |
| WO | WO-2015131333 A1 | * | 9/2015 | ......... C04B 20/1029 |

OTHER PUBLICATIONS

Zhu, WO2015131333-MT (Year: 2015).*
Kojo, JP2018203582-MT (Year: 2018).*
Kazuo, JP2011256065-MT (Year: 2011).*
International Search Report of PCT Patent Application No. PCT/CN2020/099003 issued on Sep. 3, 2020.

* cited by examiner

*Primary Examiner* — Robert S Jones, Jr.
*Assistant Examiner* — Zhen Liu

(57) ABSTRACT

Disclosed are a crack self-healing agent for cement-based materials capable of binding corrosive ions in seawater, and a preparation method thereof. A core material of the agent is an active inorganic composite component capable of chemically binding Cl, Mg, and S, a wall layer is polymethyl methacrylate, and an interface improvement layer is a cement layer. A preparation method includes: (1) thoroughly mixing active components capable of binding corrosive ions, and filling a resulting mixture into a direct compression mold; (2) applying a pressure to the direct compression mold and holding the pressure on using a pressing machine, and demolding to obtain a core material body; (3) placing the core material body obtained in a solution of PMMA in acetone for coating, and taking out the core material body and drying; (4) coating a layer of cement before the acetone is completely volatilized to obtain the crack self-healing agent.

3 Claims, 2 Drawing Sheets

CRACK SELF-HEALING AGENT FOR CEMENT-BASED MATERIALS CAPABLE OF BINDING CORROSIVE IONS IN SEAWATER, AND PREPARATION METHOD THEREOF

CROSS REFERENCE TO RELATED APPLICATIONS

The present application is a Continuation-In-Part Application of PCT Application No. PCT/CN2020/099003 filed on Jun. 29, 2020, which claims the benefit of Chinese Patent Application No. 201910652139.7 filed on Jul. 18, 2019. All the above are hereby incorporated by reference in their entirety.

TECHNICAL FIELD

The present disclosure relates to the technical field of marine concrete, and in particular to a crack self-healing agent for cement-based materials capable of binding corrosive ions in seawater, and a preparation method thereof.

BACKGROUND

Cement concrete is the most widely used material with the largest output worldwide, which is an indispensable material for the construction of maritime hydraulic structures such as wharves, bridges, and submarine tunnels. It is well known that concrete is a brittle material with low tensile strength, and during a construction and service process of a concrete structure, due to temperature and humidity changes, external loads, and other factors, concrete will undergo cracks of different sizes. Ocean is a complex multi-ion environment, and cracks in concrete will provide channels for the diffusion of corrosive ions ($Cl^-$, $SO_4^{2-}$, $Mg^{2+}$, and the like) in the marine environment, which accelerates the diffusion of the corrosive ions into the concrete, thereby deteriorating the performance of the concrete itself. Moreover, these corrosive ions can also cause corrosion of steel bars, which can cause premature failure of reinforced concrete structures and even cause catastrophic accidents. In order to extend a service life of reinforced concrete structures, concrete cracks usually need to be repaired manually. However, because manpower supply and material transportation are difficult and underwater repair projects are difficult to operate, manual repair is not suitable for maritime hydraulic structures.

Therefore, some scholars have proposed the "concrete self-healing technology", where a healing agent is built in concrete when molding; and when a structure cracks in service, cracks trigger the healing agent to react with the external environment, and a resulting healing product seals the cracks to prevent external corrosive ions from entering the structure and prolong a service life of the structure. Existing crack self-healing agents can be roughly divided into three types:

1. Crack self-healing technology based on microcapsules/fiberglass tubes: Binder-containing fiberglass tubes or microcapsules are added to concrete; and when a structure cracks, the fiberglass tubes or microcapsules are penetrated by cracks, and the binder contained therein flows out and hardens, thereby sealing the cracks. However, most binders can only harden in the air, which is not suitable for the self-healing of concrete immersed in seawater or undergoing a dry-wet cycle.

2. Crack self-healing technology based on microbes: Microbes are mainly added as an active component to a cement material, and the mineralization of microbes induces the formation of calcium carbonate in cracks to seal the cracks.

3. Self-healing technology based on the addition of active components: Expansive mineral materials and crystalline mineral materials are used as active components, and the crack self-healing is realized through hydration reactions of the active components.

However, the above-mentioned crack self-healing technologies 2 and 3 mostly investigate the self-healing behaviors of active components under fresh water conditions, which can heal cracks with the maximum width of 300 μm to 500 μm and requires a relatively long healing time (≥28 days). In a marine environment with a high concentration of corrosive ions, steel bars may be corroded during a slow self-healing process, which makes the self-healing severely limited in improving the durability of concrete in the marine environment.

SUMMARY

In view of the technical defects and gaps in the prior art, the present disclosure is intended to provide a crack self-healing agent for cement-based materials capable of binding corrosive ions in seawater, and a preparation method thereof. The crack self-healing agent is composed of an active component core material capable of binding corrosive ions, a wall layer, and an interface improvement layer. The direct compression process is used to process active components capable of binding corrosive ions into a core material, then several layers of PMMA are coated on a surface of the core material, and finally a layer of cement powder is coated to obtain the crack self-healing agent for cement-based materials capable of binding corrosive ions in seawater, which has a specified strength, is waterproof, and shows prominent compatibility with a cement matrix.

The objective of the present disclosure is achieved by the following technical solutions.

A crack self-healing agent for cement-based materials capable of binding corrosive ions in seawater is provided, including an active component core material capable of binding corrosive ions, a wall layer, and an interface improvement layer, where the active component core material capable of binding corrosive ions is a mixture of a calcium-containing inorganic substance, an aluminum-containing inorganic substance, and a macromolecule water-absorbent resin; the wall layer is a polymethyl methacrylate (PMMA) layer, which covers the active component core material capable of binding corrosive ions; and the interface improvement layer is a cement layer.

Further, a molar ratio of the calcium-containing inorganic substance to the aluminum-containing inorganic substance may be (3-5):1; and a weight of the macromolecule water-absorbent resin may be 0% to 10% of a total weight of the calcium-containing inorganic substance and the aluminum-containing inorganic substance.

Further, the calcium-containing inorganic substance may include one or more from the group consisting of calcium oxide and calcium hydroxide; and the aluminum-containing inorganic substance may include one or more from the group consisting of sodium metaaluminate and metakaolin.

Further, the crack self-healing agent may have a particle size of 4 mm to 8 mm.

A preparation method of the crack self-healing agent for cement-based materials capable of binding corrosive ions in seawater described above is provided, including the following steps:

(1) thoroughly mixing active components capable of binding corrosive ions, and filling a resulting mixture into a direct compression mold;
(2) applying a pressure to the direct compression mold and holding the pressure on using a pressing machine, and demolding to obtain a core material body;
(3) placing the core material body obtained in a solution of PMMA in acetone for coating, and taking out the core material body and drying; and
(4) coating a layer of cement before the acetone is completely volatilized to obtain the crack self-healing agent for cement-based materials capable of binding corrosive ions in seawater.

Further, in step (1), a calcium-containing inorganic substance, an aluminum-containing inorganic substance, and a macromolecule water-absorbent resin may be adopted as the active components capable of binding corrosive ions.

Further, in step (1), the materials may be mixed using a V-type mixer.

Further, in step (2), a pressure of 250 psi to 750 psi may be applied.

Further, in step (2), a pressure of 250 psi to 750 psi may be held.

Further, in step (2), the pressure may be held for 30 s to 60 s.

Further, in step (3), the solution of PMMA in acetone may have a concentration of 0.2 g/mL to 0.3 g/mL.

Further, in step (3), the process of placing the core material body obtained in a solution of PMMA in acetone for coating and taking out the core material body and drying may be repeated 3 to 6 times.

Further, in step (3), the drying may be conducted in a fume hood.

The present disclosure also provides a method for crack self-healing and steel bar protection in marine concrete, including: using the crack self-healing agent for cement-based materials capable of binding corrosive ions in seawater described above.

Further, the method may include: adding the crack self-healing agent during cement molding to obtain a self-healing cement paste.

Furthermore, the crack self-healing agent may be added at a volume fraction of 3% to 8% in the cement paste.

It can be seen from the above technical solutions that, with the crack self-healing agent capable of binding corrosive ions according to the present disclosure added into a cement paste, when a matrix cracks, the crack self-healing agent is penetrated by cracks, and seawater enters the matrix and contacts the active component inside the crack self-healing agent. The active component is a combination of a calcium-containing inorganic substance, an aluminum-containing inorganic substance, and a macromolecule water-absorbent resin, which chemically reacts with seawater to generate a Friedel's salt, ettringite, and hydrotalcite, thereby chemically binding $Cl^-$, $SO_4^{2-}$, and $Mg^{2+}$ in the seawater. In this way, the concentrations of corrosive ions inside cracks and near steel bars are reduced to protect steel bars and prolong a service life of a component.

Compared with the prior art, the present disclosure has the following beneficial effects:

The crack self-healing agent provided in the present disclosure ruptures after a cement matrix cracks, and then chemically reacts with seawater entering cracks, which can not only realize the crack self-healing, but also bind corrosive ions ($Cl^-$, $SO_4^{2-}$, and $Mg^{2+}$) entering the cracks with the seawater, thereby effectively protecting steel bars in concrete.

DETAILED DESCRIPTION

The technical solutions of the present disclosure will be further described in detail below in conjunction with specific examples and accompanying drawings, but the protection scope and implementation manners of the present disclosure are not limited thereto.

In a specific embodiment of the present disclosure, the calcium oxide used is analytically pure, with a particle size of 200 mesh; the sodium metaaluminate used is analytically pure, with a particle size of 200 mesh; the metakaolin used is commercially pure, with a particle size of 3 μm; and the macromolecule water-absorbent resin used is commercially pure, with a particle size of 50 mesh to 60 mesh.

The crack self-healing agent for cement-based materials capable of binding corrosive ions in seawater provided in the present disclosure includes an active component core material capable of binding corrosive ions, a wall layer, and an interface improvement layer, where the active component core material capable of binding corrosive ions is a mixture of a calcium-containing inorganic substance, an aluminum-containing inorganic substance, and a macromolecule water-absorbent resin; the wall layer is a PMMA layer, which covers the active component core material capable of binding corrosive ions; and the interface improvement layer is a cement layer. A molar ratio of the calcium-containing inorganic substance to the aluminum-containing inorganic substance may be (3-5):1; a weight of the macromolecule water-absorbent resin may be 0% to 10% of a total weight of the calcium-containing inorganic substance and the aluminum-containing inorganic substance; and the calcium-containing inorganic substance may be calcium oxide, and the aluminum-containing inorganic substance may be sodium metaaluminate. The crack self-healing agent may have a particle size of 5 mm to 7 mm.

Example 1

A crack self-healing agent for cement-based materials capable of binding corrosive ions in seawater was provided, and a preparation method thereof specifically included the following steps:

(1) Calcium oxide, sodium metaaluminate, and low cross-linked sodium polyacrylate (macromolecule water-absorbent resin) were adopted as active components capable of binding corrosive ions, 10 g of calcium oxide, 5 g of sodium metaaluminate, and 1.5 g of low cross-linked sodium polyacrylate were each weighed and thoroughly mixed in a V-type mixer, an appropriate amount of a resulting mixture was filled into a direct compression mold, and the mold was assembled.

Figure 1:
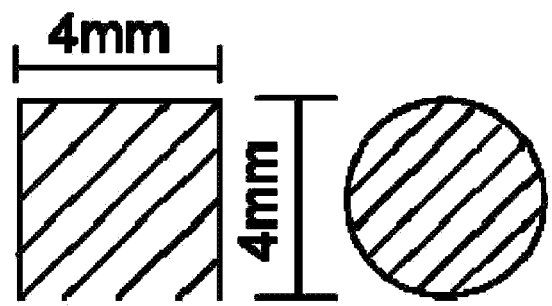
FIG. 1 is a schematic diagram of the core material prepared in the present disclosure.

(2) A pressure of 750 psi was applied to the direct compression mold using a pressing machine and held for 30 s, and then demolding was conducted to obtain a core material, as shown in FIG. 1.

Figure 2:
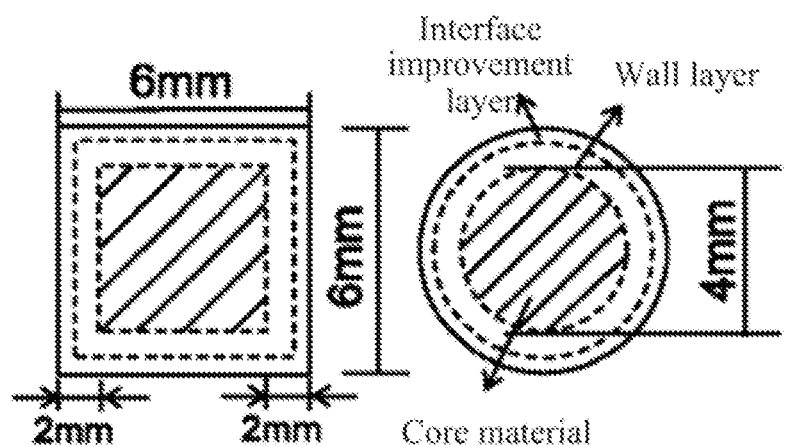
FIG. 2 is a schematic diagram of the cement self-healing agent capable of binding corrosive ions prepared in the present disclosure.

(3) The core material was immersed in a solution of 0.2 g/mL PMMA in acetone, then taken out after a surface of the core material was completely wetted, and then dried in a fume hood until the acetone was completely volatilized. The immersion and drying process was repeated 6 times. Before the acetone was completely volatilized the last time, a layer of cement powder was coated on the surface to finally obtain the crack self-healing agent with a size of 6 t 1 mm, as shown in FIG. 2.

Figure 3:
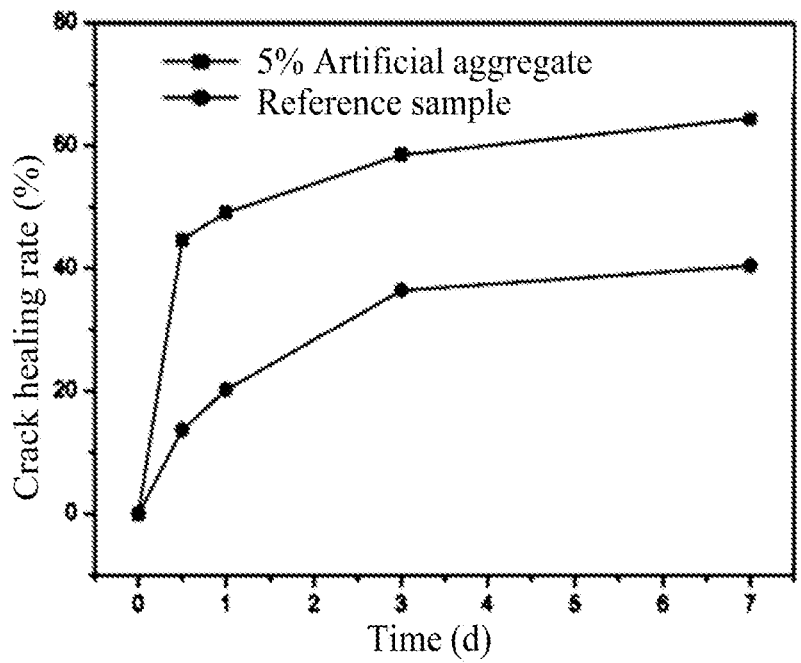
FIG. 3 shows a crack healing rate curve of the self-healing cement paste prepared in Example 1 of the present disclosure.

(4) The crack self-healing agent was added to a cement paste at 5% of a volume of the cement paste. As shown in FIG. 3, when a hardened cement paste cracks, the crack self-healing agent enables cement test blocks to quickly block cracks of 0.4 mm, which can effectively prevent environmental corrosive ions from entering an interior of a matrix.

Example 2

A crack self-healing agent for cement-based materials capable of binding corrosive ions in seawater was provided, and a preparation method thereof specifically included the following steps:

(1) Calcium oxide, metakaolin, and low cross-linked sodium polyacrylate (macromolecule water-absorbent resin) were adopted as active components capable of binding corrosive ions, 16 g of calcium oxide, 6 g of metakaolin, and 1.1 g of low cross-linked sodium polyacrylate were each weighed and thoroughly mixed in a V-type mixer, an appropriate amount of a resulting mixture was filled into a direct compression mold, and the mold was assembled.

(2) A pressure of 250 psi was applied to the direct compression mold using a pressing machine and held for 60 s, and then demolding was conducted to obtain a core material, as shown in FIG. 1.

(3) The core material was immersed in a solution of 0.3 g/mL PMMA in acetone, then taken out after a surface of the core material was completely wetted, and then dried in a fume hood until the acetone was completely volatilized. The immersion and drying process was repeated 3 times. Before the acetone was completely volatilized the last time, a layer of cement powder was coated on the surface to finally obtain the crack self-healing agent with a size of 6±1 mm, as shown in FIG. 2.

Figure 4:
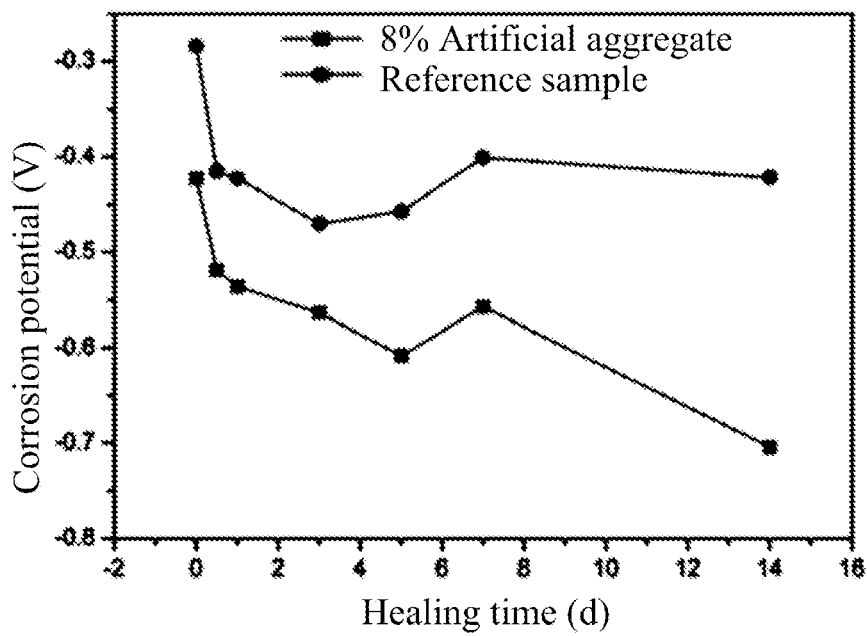
FIG. 4 shows an open circuit potential (OCP) curve of a steel bar in the self-healing cement paste prepared in Example 2 of the present disclosure.

(4) The crack self-healing agent was added to a cement paste at 8% of a volume of the cement paste. As shown in FIG. 4, when a hardened cement paste cracks, the crack self-healing agent can effectively reduce an OCP of steel bars in the matrix, which reduces the possibility of steel bar corrosion and shows some degree of reinforcement.

The examples above are preferred implementations of the present disclosure. However, the implementations of the present disclosure are not limited by the examples above. Any change, modification, substitution, combination, and simplification made without departing from the spiritual essence and principle of the present disclosure should be an equivalent replacement manner, and all are included in the protection scope of the present disclosure.

The invention claimed is:

1. A crack self-healing agent for cement-based materials capable of binding corrosive ions in seawater, comprising an active component core material capable of binding corrosive ions, a wall layer, and an interface improvement layer, wherein the active component core material capable of binding corrosive ions is a mixture of a calcium-containing inorganic substance, an aluminum-containing inorganic substance, and a macromolecule water-absorbent resin; the wall layer is a polymethyl methacrylate (PMMA) layer, which covers the active component core material capable of binding corrosive ions; the interface improvement layer is a cement layer, the interface improvement layer is coated outside the wall layer;

wherein a molar ratio of the calcium-containing inorganic substance to the aluminum-containing inorganic substance is (3-5):1; and a weight of the macromolecule water-absorbent resin is 0% to 10% of a total weight of the calcium-containing inorganic substance and the aluminum-containing inorganic substance.

2. The crack self-healing agent for cement-based materials capable of binding corrosive ions in seawater according to claim 1, wherein the calcium-containing inorganic substance comprises one or more from the group consisting of calcium oxide and calcium hydroxide; and the aluminum-containing inorganic substance comprises one or more from the group consisting of sodium metaaluminate and metakaolin.

3. The crack self-healing agent for cement-based materials capable of binding corrosive ions in seawater according to claim 1, wherein the crack self-healing agent has a particle size of 4 mm to 8 mm.

* * * * *